US006707057B2

(12) United States Patent
Cresens et al.

(10) Patent No.: US 6,707,057 B2
(45) Date of Patent: Mar. 16, 2004

(54) STORAGE PHOSPHOR SCREEN WITH THICK OUTERMOST LAYER AND A METHOD FOR USING THE SAME

(75) Inventors: Marc Cresens, Diest (BE); Peter Willems, Stekene (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/795,455

(22) Filed: Mar. 1, 2001

(65) Prior Publication Data

US 2001/0030301 A1 Oct. 18, 2001

Related U.S. Application Data

(60) Provisional application No. 60/198,632, filed on Apr. 20, 2000.

(30) Foreign Application Priority Data

Mar. 23, 2000 (EP) .......................................... 00201030

(51) Int. Cl.[7] .......................................... G03B 42/02
(52) U.S. Cl. .................................. 250/581; 250/484.4
(58) Field of Search ............................ 250/581, 484.4

(56) References Cited

U.S. PATENT DOCUMENTS 3,859,527 A 1/1975 Luckey
4,394,581 A * 7/1983 Takahashi et al. ....... 250/484.4
4,585,944 A 4/1986 Teraoka
4,604,525 A 8/1986 Kitada et al.
4,696,868 A 9/1987 Aoki et al.
5,023,461 A * 6/1991 Nakazawa et al. ....... 250/484.4
5,066,864 A 11/1991 Brandner et al.
5,483,081 A 1/1996 Hosoi
5,877,508 A 3/1999 Arakawa et al.

FOREIGN PATENT DOCUMENTS

EP 0 021 174 A1 1/1981
EP 0 158 862 A1 10/1985
EP 0 233 497 A1 3/1987

* cited by examiner

*Primary Examiner*—Constantine Hannaher
*Assistant Examiner*—Shun Lee
(74) *Attorney, Agent, or Firm*—Breiner & Breiner, L.L.C.

(57) ABSTRACT

A photostimulable phosphor screen including a photostimulable phosphor and a transparent outermost layer with a thickness, d, larger than 150 μm for providing enhanced sharpness of an image obtained in portions with a higher spatial frequency than 2 line pairs per mm by applying a method for reading a radiation image stored in a photostimulable storage phosphor screen with a thick transparent outermost layer when the screen is stimulated through the transparent outermost layer and the stimulated light is read through the transparent outermost layer.

5 Claims, No Drawings

STORAGE PHOSPHOR SCREEN WITH THICK OUTERMOST LAYER AND A METHOD FOR USING THE SAME

RELATED APPLICATION

The application claims benefit under 35 U.S.C. §119(e) of U.S. Provisional Application No. 60/198,632 filed Apr. 20, 2000.

FIELD OF THE INVENTION

This invention relates to storage phosphor screens and to a method for recording and reproducing X-ray images by the use thereof.

BACKGROUND OF THE INVENTION

A well-known use of storage phosphors is in the production of X-ray images. In U.S. Pat. No. 3,859,527 method for producing X-ray images with a photostimulable phosphor, which being incorporated in a panel is disclosed. The panel is exposed to incident pattern-wise modulated X-ray beam and as a result thereof the phosphor temporarily stores energy contained in the X-ray radiation pattern. At some interval after the exposure, a beam of visible or infra-red light scans the panel to stimulate the release of stored energy as light that is detected and converted to sequential electrical signals which are can be processed to produce a visible image. For this purpose, the phosphor should store as much as possible of the incident X-ray energy and emit as little as possible of the stored energy until stimulated by the scanning beam. This is called "digital radiography" or "computed radiography".

The image quality that is produced by any radiographic system using phosphor screen, thus also in a digital radiographic system, depends largely on the construction of the phosphor screen.

Several ways and means to provide storage phosphor screens—and/or methods for using them—combining high speed with high resolution and low noise have been proposed. In, e.g., U.S. Pat. No. 4,585,944 it is disclosed to provide a storage phosphor screen that carries, on the side of the screen where the stimulating rays are entering the screen, one or more layers having an average thickness ($d_{av}$) such that, for each of the layers present, the product of $d_{av}$ with the refractive index of the layer is larger than 1.05 times the wavelength of the stimulating rays. It is shown in that disclosure that especially, when a transparent protective layer is adhered to the phosphor layer by means of an adhesive layer, the thickness of the adhesive layer should also fulfil the condition mentioned above.

In, e.g., EP-A-233 497 a radiation image storage panel is disclosed, comprising a phosphor layer which contains a stimulable phosphor, characterised in that one surface of said phosphor layer is provided with a mullet-layer optical filter which has a transmittance of not less than 70% for the light of the stimulation wavelength of said stimulable phosphor and at an incident angle in the range of 0–5 degrees and has a reflectance of not less than 60% for the light of said stimulation wavelength and at an incident angle of not smaller than 30 degrees.

In EP-A-440 853 a luminescent storage screen is disclosed for storing latent x-ray images, said storage screen being read-out by excitation with stimulating radiation having a first wavelength, said storage screen comprising a stimulable phosphor in which said x-ray image is latently stored which is reactive to said radiation of first wavelength to emit radiation of a second wavelength, and at least one optical layer coating a surface of said stimulable phosphor layer for reducing reflections at least of said radiation having said first wavelength and being highly transmissive at least for said radiation having said first wavelength.

In U.S. Pat. No. 5,877,508 a radiation image storage panel is disclosed, comprising a substrate and a stimulable phosphor layer, which is overlaid on the substrate constituted of a material, which transmits the light emitted by the stimulable phosphor layer and absorbs and/or scatters light having wavelengths falling within a stimulation wavelength range for the stimulable phosphor layer. Stimulation rays are shown to impinge on the screen at the side opposite to the surface and the emitted light is captured on the side whereon the stimulating rays impinge as well as on the side opposite to said first side. The light having wavelengths falling within the stimulation wavelength range is thus prevented from passing or propagating through the substrate so that it does not disturb the reading of the stimulated light on that side of the screen, and the signal-to-noise ratio of an image signal detected from the radiation image storage panel is thereby prevented from becoming low.

In EP-A-021 174 it is disclosed that the sharpness of the image produced by a storage phosphor screen comprising a support, a phosphor layer and a protective film can be enhanced when at least one of the support, phosphor layer or protective film comprises a colorant absorbing stimulating light.

In EP-A-158 862 it is disclosed that the sharpness of a phosphor screen could be further enhanced when the protective layer is adhered to the phosphor layer by an adhesive layer which comprises a colorant absorbing stimulating light.

The use of storage phosphor screens according to the disclosures above does indeed provide the possibility of creating sharp x-ray images, but it is, in X-ray imaging, an everlasting desire to further increase the sharpness of an image.

OBJECTS AND SUMMARY OF THE INVENTION

It is an object of the invention to provide a method for recording and reproducing images made by penetrating radiation that have high resolution, especially in the higher frequencies.

It is a further object of the invention to provide a storage phosphor screen for use in a method for recording and reproducing images made by penetrating radiation that have high resolution, especially in the higher frequencies.

The object of the invention is realised by providing a method for reading a radiation image stored in a photostimulable storage phosphor screen stimulating said photostimulable phosphor screen to release stimulated light and collecting said stimulated light characterised in that:

said phosphor screen has a transparent outermost layer with a thickness, d, higher than 150 $\mu$m and both said stimulating and said collecting proceed through said transparent outermost layer.

The further object of the invention is realised by providing a stimulable phosphor screen having a transparent outermost layer with a thickness, d, higher than 150 $\mu$m.

Preferably said thickness of said outermost layer is such that $150 < d \leqq 4000$ $\mu$m.

More preferably said outermost layer comprises a colorant absorbing the stimulating light.

Further advantages and embodiments of the present invention will become apparent from the following description.

DETAILED DESCRIPTION OF THE INVENTION

In this document the term "penetrating radiation" is used to include i.a. radiation originating from a radioisotope (e.g. a Co60 source), radiation created by an X-ray generator of any type, radiation and high energy particles created by a high energy radiation generator (e.g. Betatron), radiation from a sample labelled with a radioisotope as is the case in e.g. autoradiography.

It was now found that the sharpness of an image—produced by image wise absorbing penetrating radiation in a storage phosphor screen and stimulating the screen for releasing the stored energy—could be enhanced, especially in the portions with higher spatial frequency (i.e. >2 lp/mm) when the stimulation of the energy stored in the storage screen and the reading of the stimulated light proceeded via a thick outermost layer, i.e. a transparent layer with a thickness, d, larger than 150 $\mu$m. Preferably said thickness is such that 150 $\mu m < d \leqq 4000\ \mu m$. Even more preferably, said thick outermost layer has a thickness, d, such that 150 $\mu m < d \leqq 2500\ \mu m$. Even when the stimulation of the stored energy and reading the amount of stimulated light proceeds through a thick (thickness 180 $\mu$m), non-coloured layer, the beneficial effect on sharpness in the region of higher frequencies is seen. In that case the square wave response was higher from a spatial frequency of 4 lp/mm on, when compared to the stimulating and reading through a thin (thickness 10 $\mu$m) non-coloured transparent layer, at frequencies lower than 4 lp/mm the square wave response when stimulating and reading through the thick layer was lower.

Preferably the thick outermost layer, through which the stimulation of the energy stored in the screen and the reading of the stimulated light proceeds, is coloured with a colorant that selectively absorbs the stimulating light (i.e. a colorant that does not absorb or only very slightly absorbs the stimulated light). When the colouring of the thick outermost layer, through which the stimulation of the screen proceeds in the method of this invention, is adjusted so as to have the same absorption of stimulating light as a coloured thin (10 $\mu$m) outermost layer, the dose of penetrating radiation necessary to form an image remained the same, but the sharpness of the final image is higher, especially when looking at portion in the image having a spatial frequency higher than 2 lp/mm. This was even so when comparing this method with a method wherein the stimulating and the reading proceeds through a thin coloured protective layer as described in EP-A-021 174. In the case when stimulation of the energy stored in the screen and the reading of the stimulated light proceeds through a thick outermost layer, it was possible to chose the degree of coloration so that the SWR (Square Wave Response) at low frequencies was as high as when the stimulating and the reading proceeds through a thin coloured protective layer as described in EP-A-021 174, in the higher frequencies, the SWR was higher. When using a screen with a thick outermost layer selectively absorbing the stimulating light, the intensity of the light used to stimulate the screen, it is beneficial for the speed of the system to adapt the intensity of the stimulating light to the degree of absorption. When using laser light with a wavelength above 510 nm to stimulate the screen in a method according to this invention it was found that a very good compromise between speed and increase in sharpness could be obtained when the thick outermost layer in a screen for use in this invention is coloured so that it shows a transmission spectrum with, in the region below 480 nm, at least 65% transmission and, in the region above 510 nm, at most 65% transmission. In systems where using higher laser power to stimulate the screen do not pose limits to the practicability of the method, the outermost layer can be coloured so that it shows in the region above 510 nm, at most 35% transmission.

As the colorant, either an organic colorant or an inorganic colorant can be employed for colouring the thick outermost layer used in this invention. Also mixtures of colorants can be used. By simple trial and error a coloured thick outermost layer fulfilling the spectral requirements set out immediately above can be produced. For example, the organic having a body colour ranging from blue to green which can be employed in the radiation image storage panel of the present invention includes ZAPON FAST BLUE 3G (manufactured by Hoechst AG.), ESTROL BRILL BLUE N-3RL (manufactured by Sumitomo Kagaku Co., Ltd.), SUMIACRYL BLUE F-GSL (manufactured by Sumitomo Kagaku Co., Ltd.), D & C BLUE NO.1 (manufactured by National Aniline Co., Ltd.), SPIRIT BLUE (manufactured by Hodogaya Kagaku Co., Ltd.), OIL BLUE NO.603 (manufactured by Orient Co., Ltd.), KITON BLUE A (manufactured by Ciba Geigy AG.), AIZEN CATHILON BLUE GLH (manufactured by Hogogaya Kagaku Co., Ltd.), LAKE BLUE A.F.H (manufactured by Kyowa Sangyo Co., Ltd.), RODALIN BLUE 6GX (manufactured by Kyowa Sangyo Co., Ltd.), PRIMOCYANINE 6GX (manufactured by Inahata Sangyo Co., Ltd.), BRILLACID GREEN 6BH (manufactured by Hodogaya Kagaku Co., Ltd.), CYANINE BLUE BNRS (manufactured by Toyo Ink Co., Ltd.), LIONOL BLUE SL (manufactured by Toyo Ink Co., Ltd.), and the like. For example, the inorganic colorant having a body colour ranging from blue to green which can be employed in the radiation image storage panel of the present invention includes ultramarine blue, cobalt blue, cerulean blue, chromium oxide, pigment of TiO2—ZnO—CoO—NiO system, and the like.

Also a blue coloured plastic film as used, e.g., as support for medical X-ray film is very well suited as outermost layer of a storage phosphor screen to be used in the method of the invention.

In a preferred embodiment of the invention the thick outermost layer of a storage phosphor screen to be used in this invention is an optical blue filter as, e.g., Schott filter BG24a (Trade name), Schott filter BG26 (Trade name), The thick outermost layer of a screen for use in the method of this invention can beneficially be chosen such as to have a refractive index that is equal to or larger than the refractive index of the phosphor layer.

The storage phosphor (also called photostimulable phosphor) incorporated in a screen with a thick outermost layer for use in the method of this invention can be any storage phosphor known in the art. It can be an alkaline earth metal fluorohalide phosphor represented by the formula: $(Ba_{1-x}M_x^{II})FX{:}yA$ wherein $M^{II}$ is one or more of Mg, Ca, Sr, Zn and Cd; X is one or more of Br, Cl or I A is at least one member of the group consisting of Eu, Tb, Ce, Tm, Dy, Pr, Ho, Nd, Yb and Er; and x is in the range $0 \leqq x \leqq 0.6$ and y is in the range $0 \leqq y \leqq 0.2$, and that the wavelength of said stimulating rays is not less than 500 nm.

Any variant of alkaline earth metal fluorohalide stimulable phosphor is useful in the present invention. Typical examples of such stimulable phosphors are given below, without however limiting the bariumfluorohalide useful in the present invention to these examples.

In EP-A 345 903 a phosphor has been disclosed with formula

Ba1-xSrxF2-a-bBraXb:zA, wherein X is at least one member selected from the group consisting of Cl and I; x is in the range 0.10≦x≦0.55; a is in the range 0.70≦a≦0.96; b is in the range 0≦b<0.15; z is in the range 10−7<z≦0.15, and A is Eu2+ or Eu2+ together with one or more of the co-dopants selected from the group consisting of Eu3+, Y, Tb, Ce, Tm, Dy, Pr, Ho, Nd, Yb, Er, La, Gd and Lu, and wherein fluorine is present stoichiometrically in said phosphor in a larger atom % than bromine taken alone or bromine combined with chlorine and/or iodine.

In U.S. Pat. No. 4,261,854 a phosphor is disclosed with formula BaFX:xCe,yA wherein 0<x≦2 10−1 en 0≦y≦5 10−3.

In U.S. Pat. No. 4,336,154 a phosphor is disclosed with formula (Ba1-xM2+x)F2.aBaX2:yEuzB, wherein 0.5≦a≦1.25; 0≦x≦1; 10−6≦y≦2 10−1; 0<z≦2 10−1.

In EP-A 704 511 a stimulable bariumfluorohalide is disclosed with formula Ba1-x-y"-z-rSrxPby"Cs2rEuzF2-a-bBraIb, wherein 0≦x≦0.30, 10−4<y"<10−3, 10−7<z<0.15, 0≦r<0.05, 0.75≦a+b≦1.00, 0.05<b<0.20.

In EP-A-835 920 a stimulable phosphor has been disclosed with formula Ba1-x-y-p-3q-zSrxMy2+M2p1+M2q3+F2-a-bBraIb:zEu, wherein M1+ is at least one alkali metal selected from the group consisting of Li, Na, K, Rb and Cs; M2+ is at least one divalent metal selected from the group consisting of Ca, Mg and Pb; M3+ is at least one trivalent metal selected from the group consisting of Al, Ga, In, Tl, Sb, Bi, Y, La, Ce, Pr, Nd, Sm, Gd, Tb, Dy, Ho, Er, Tm, Yb and Lu; 0≦x≦0.30, 0≦y≦0.10, 0≦p≦0.3, 0≦q≦0.1, 0.05≦a≦0.76, 0.20≦b≦0.90, a+b<1.00 and 10−6≦z≦0.2.

Not only bariumfluorohalide storage phosphors can be used in this invention, but also halosilicate phosphors as disclosed in, e.g., EP-A-304 121, EP-A-382 295 and EP-A-522 619.

Also alkali metal halide phosphor can be incorporated in a screen with a thick outermost layer for use in the method of this invention. Such phosphors have, e.g. been disclosed in U.S. Pat. No. 5,736,069 wherein an alkali metal storage phosphor is disclosed corresponding to the formula: $M^{1+}X.aM^{2+}X'_2BM^{3+}X''_3$:cZ wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and 0≦a≦1, 0≦b≦1 and 0<c≦0.2.

A storage phosphor screen with a thick outermost layer can be manufactured by coating a dispersion of the storage phosphor in a binder resin on a support for forming the supported storage phosphor layer and then applying said thick outermost layer on top of this phosphor layer by means of an adhesive. In this case any support known in the art can be used, it can be a polymeric support, ordinary paper, processed paper such as photographic paper, coated paper, art paper, baryta paper, resin-coated paper, sized paper as described in Belgian Patent No. 784,615, cardboard, metal, etc. It is preferred to use polymeric supports such as cellulose acetate film, polyester film, polyethylene terephthalate film, polyamide film, polyimide film, triacetate film, polycarbonate film, and the like. It can be a black support, it may be a reflecting support, e.g. a polyester incorporating white pigment(s).

It is also possible to produce the storage phosphor screen with a thick transparent outermost layer by coating the dispersion of the storage phosphor in a binder resin directly on the thick transparent outermost layer and to cover the phosphor layer with a protective layer that may be thin. In this case the protective layer is preferably a UV or EB-cured protective layer as disclosed in, e.g., EP-A-510 753 and EP-A-510 754.

The storage phosphor screen with a thick transparent outermost layer can also be a binderless screen wherein the phosphor is deposited by, e.g., vacuum deposition.

The method of this invention is especially useful for recording and reproducing X-ray images wherein it is of utmost importance that also details with high frequencies, i.e., very minute details, can be detected. Therefore the method of this invention is especially useful in mammography and in non-destructive testing of materials. In the former examination it is of utmost importance to detect very small calcifications and in the latter examination hair fine cracks have to be recorded and reproduced.

EXAMPLES

Screens

Comparative Example 1 (CE1)

A storage phosphor screen used in this was prepared by dispersing a $Ba_{0.83}Sr_{0.17}FBr$:Eu phosphor (see example 1 of U.S. Pat. No. 5,514,298) in a binder solution containing polyethylacrylate dissolved in ethyl acetate so as to have a pigment/binder ratio of 97/3 wt/wt and coating this dispersion onto a 100 μm thick black sheet of polyethylene terephthalate to give a coating weight of 880 g/m2. On top of the phosphor layer of this screen a 10 μm non-coloured transparent protective layer was applied, having an absorption of 0% for light with wavelength 678 nm.

Comparative Example 2 (CE2)

The storage phosphor screen of comparative example 1 was used except for the presence of a 10 μm thick protective layer containing a dye and having an absorption of 27.9% for light with wavelength 678 nm.

Comparative Example 3 (CE3)

This examples equals comparative example 1, except for the amount of phosphor on this screen, which was now 450 $g/m^2$.

Invention Example 1 (IE1)

The storage phosphor screen of comparative example 1 was used except for the presence of a 1250 μm thick protective layer, being a Schott blue green filter BG24a having an absorption of 30.1% for light with wavelength 678 nm.

Invention Example 2 (IE2)

The storage phosphor screen of comparative example 1 was used except for the presence of a 1000 μm thick protective layer, being a Schott blue green filter BG26 having an absorption of 33.4% for light with wavelength 678 nm.

Invention Example 3 (IE3)

The storage phosphor screen of comparative example 1 was used except for the presence of a 180 μm thick protective layer, being PET film, coloured blue with MACROLEX BLUE (trade name of Bayer AG, Leverkusen, Germany) having an absorption of 16.7% for light with wavelength 678 nm.

Invention Example 4 (IE4)

The storage phosphor screen of comparative example 1 was used except for the presence of a 180 μm thick protective layer, being clear PET film having an absorption of 0% for light with wavelength 678 nm. The amount of phosphor on this screen was 450 g/m$^2$.

Imaging Example 1

Exposure to X Rays

Five screens (CE1, CE2, E1, E2 and E3) were exposed during 64 sec. with X-rays having 50 kVp using no filtration, using as object a Funk raster with spatial frequencies 0.25, 0.5, 1, 2, 3, 4 and 5 lp/mm.

Read-out of the Images

The storage phosphor screen were stimulated with a diode laser emitting light of 678 nm. The laser power was 16.5 mW, the Full Width Half Maximum (FWHM) of the laser spot was 40 μm and the emitted light was read as square pixels a side 56.5 μm. The reading time per pixel was adjusted so as to have for each screen a 66% read-out depth. The stimulated light was read with a photomultiplier (PMT) with a System Gain factor 7,4 (i.e. the ratio of light photons falling on PMT cathode to incoming X-ray photons) and a Swank Factor 0,588 (i.e. Poisson excess noise factor). Both the stimulation and the read-out proceeded through the protective layer.

Measurement

The Square Wave Response (SWR) of the images of the Funk raster on every screen were measured, taking the square wave response of the screen of CE1 at 0.025 lp/mm as 1.00. The results are given in table 1

TABLE 1

| | | SWR at | | | | | |
|---|---|---|---|---|---|---|---|
| # | Speed | 0.5 lp/mm | 1 lp/mm | 2 lp/mm | 3 lp/mm | 4 lp/mm | 5 lp/mm |
| CE1 | 100 | 84.8 | 67.7 | 34.9 | 16.3 | 10.1 | 6.7 |
| CE2 | 66 | 89.5 | 76.7 | 51.6 | 26.5 | 17.9 | 11.5 |
| E1 | 67 | 77.4 | 66.4 | 45.4 | 28.3 | 20.2 | 15.0 |
| E2 | 67 | 89.0 | 74.0 | 45.7 | 30.7 | 20.5 | 13.4 |
| E3 | 74 | 70.8 | 59.3 | 46.7 | 29.7 | 23.0 | 17.0 |

For each of the images the Detective Quantum Efficiency (DQE) was calculated via the simplified formula for calculating the DQE of a CR (Computer radiography) system, published by Lubinsky et al. SPIE Vol.767 (1987) p; 167:

$$DQE_{(f)} = \frac{\alpha}{1 + \varepsilon/m + \beta + \frac{1}{G \cdot MTF^2_{(f)}}}$$

wherein

α=X-ray absorption

∈/m=Poisson excess noise=excess noise due to optical depth defects

G=gain factor=g.$\eta_{scan}$ with g: average number of electrons stored for each absorbed X-ray photon and $\eta_{scan}$ DQE of the scanning process MTF$_{(f)}$=MTF of the system calculated from the SWR.

The results are given in table 2

TABLE 2

| | | DQE at | | | | | |
|---|---|---|---|---|---|---|---|
| # | Speed | 0.5 lp/mm | 1 lp/mm | 2 lp/mm | 3 lp/mm | 4 lp/mm | 5 lp/mm |
| CE1 | 100 | 0.364 | 0.336 | 0.209 | 0.074 | 0.032 | 0.015 |
| CE2 | 66 | 0.370 | 0.353 | 0.290 | 0.152 | 0.086 | 0.040 |
| E1 | 67 | 0.354 | 0.333 | 0.265 | 0.165 | 0.104 | 0.064 |
| E2 | 67 | 0.370 | 0.348 | 0.266 | 0.182 | 0.106 | 0.053 |
| E3 | 74 | 0.342 | 0.315 | 0.270 | 0.175 | 0.126 | 0.079 |

Imaging Example 1

Exposure to X Rays

Two screens (CE3 and E4) were exposed with a molybdenum tube having a window of 30 μm Molybdenum and 40 mm of Plexiglas with X-rays having 26 kVp using no filtration, using as object a Funk raster with spatial frequencies 0.25, 0.5, 1, 2, 3, 4 and 5 lp/mm.

Read-out of the Images

The storage phosphor screens were stimulated with a diode laser emitting light of 678 nm. The laser power was 16.5 mW, the Full Width Half Maximum (FWHM) of the laser spot was 40 μm and the emitted light was read as square pixels a side 56.5 μm. The reading time per pixel was adjusted so as to have for each screen a 66% read-out depth. The stimulated light was read with a photomultiplier (PMT) with a System Gain factor 2.3 (i.e. the ratio of light photons falling on PMT cathode to incoming X-ray photons) and a Swank Factor 0,7 (i.e. Poisson excess noise factor). Both the stimulation and the read-out proceeded through the protective layer.

Measurement

The Square Wave Response (SWR) of the images of the Funk raster on every screen were measured, taking the square wave response of the screen of CE1 at 0.025 lp/mm as 1.00. The results are given in table 3

TABLE 3

| | | SWR at | | | | | |
|---|---|---|---|---|---|---|---|
| # | Speed | 0.5 lp/mm | 1 lp/mm | 2 lp/mm | 3 lp/mm | 4 lp/mm | 5 lp/mm |
| CE3 | 100 | 88.4 | 82.3 | 58.7 | 37.0 | 22.1 | 14.4 |
| E4 | 100 | 66.3 | 52.2 | 45.5 | 36.5 | 27.6 | 20.5 |

For each of the images the Detective Quantum Efficiency (DQE) was calculated via the simplified formula for calculating the DQE of a CR (Computer radiography) system, as described above. The results are given in table 4.

TABLE 4

| # | Speed | DQE at 0.5 lp/mm | 1 lp/mm | 2 lp/mm | 3 lp/mm | 4 lp/mm | 5 lp/mm |
|---|---|---|---|---|---|---|---|
| CE3 | 100 | 0.344 | 0.325 | 0.231 | 0.122 | 0.051 | 0.022 |
| E4 | 100 | 0.265 | 0.200 | 0.166 | 0.120 | 0.075 | 0.042 |

What is claimed is:

1. A method for reading a radiation image stored in a photostimulable storage phosphor screen comprising stimulating said photostimulable phosphor screen to release stimulated light, and collecting said stimulated light, wherein said phosphor screen has an outermost layer with a thickness d where 150 $\mu$m<d≦4000 $\mu$m, wherein said outermost layer is colored with a colorant that selectively absorbs stimulating radiation, wherein both said stimulating and said collecting proceed through said outermost layer, and wherein said image is provided with an enhanced sharpness in portions of the image having a spatial frequency higher than 2 line pairs per mm.

2. A method according to claim 1, wherein said stimulating proceeds with light having a wavelength higher than 600 nm and said outermost layer is a blue filter.

3. A photostimulable phosphor screen comprising a photostimulable phosphor and an outermost layer with a thickness d where 150 $\mu$m d≦4000 $\mu$m, wherein said outermost layer outermost layer is colored with a colorant that selectively absorbs stimulating radiation and wherein upon stimulation in order to release stimulated light and collection said stimulated light, an image is provided with an enhanced sharpness in portions of the image having a spatial frequency higher than 2 line pairs per mm.

4. A stimulable phosphor screen according to claim 3, wherein said stimulating radiation has a wavelength higher than 600 nm and said outermost layer is a blue filter.

5. A stimulable phosphor screen according to claim 3, wherein said screen further comprises a support.

* * * * *

UNITED STATES PATENT AND TRADEMARK OFFICE

CERTIFICATE OF CORRECTION

PATENT NO. : 6,707,057 B1 — Page 1 of 1
DATED : March 16, 2004
INVENTOR(S) : Marc Cresens It is certified that error appears in the above-identified patent and that said Letters Patent is hereby corrected as shown below:

<u>Column 10,</u>
Line 12, "collection" should read -- collecting --.

Signed and Sealed this

Twelfth Day of April, 2005

JON W. DUDAS
*Director of the United States Patent and Trademark Office*

UNITED STATES PATENT AND TRADEMARK OFFICE

CERTIFICATE OF CORRECTION

PATENT NO. : 6,707,057 B2
DATED : March 16, 2004
INVENTOR(S) : Marc Cresens et al.

It is certified that error appears in the above-identified patent and that said Letters Patent is hereby corrected as shown below:

Column 10,
Line 12, "collection" should read -- collecting --.

This certificate supersedes Certificate of Correction issued April 12, 2005.

Signed and Sealed this

Twenty-eighth Day of June, 2005

JON W. DUDAS
*Director of the United States Patent and Trademark Office*